United States Patent [19]

Newton et al.

[11] Patent Number: 5,445,861
[45] Date of Patent: Aug. 29, 1995

[54] LIGHTWEIGHT HONEYCOMB PANEL STRUCTURE

[75] Inventors: Jefferson F. Newton, Seattle; Thomas D. Martin; Willard N. Westre, both of Bellevue; David J. Carbery, Vashon Island; Roy Ikegami, Seattle, all of Wash.

[73] Assignee: The Boeing Company, Seattle, Wash.

[21] Appl. No.: 940,501

[22] Filed: Sep. 4, 1992

[51] Int. Cl.⁶ .............................................. B32B 3/12
[52] U.S. Cl. ................................. 428/116; 428/73; 428/118; 428/131; 428/178; 52/395.1; 244/121; 181/290; 181/292
[58] Field of Search ............... 428/116, 118, 131, 73, 428/178; 52/806, 808, 795; 244/121; 181/292, 290

[56] References Cited

U.S. PATENT DOCUMENTS

| | | | |
|---|---|---|---|
| 3,095,943 | 7/1963 | Kemp | 428/73 |
| 3,211,253 | 10/1965 | Gonzalez | 181/292 |
| 3,380,206 | 4/1968 | Barnett | 428/73 |
| 4,084,367 | 4/1978 | Saylor | 181/292 |
| 4,112,164 | 9/1978 | Koss | 428/116 |
| 4,291,078 | 9/1981 | Hom | 428/116 |
| 4,301,890 | 11/1981 | Zalas | 428/116 |
| 4,335,174 | 6/1982 | Belko | 428/73 |
| 4,522,859 | 6/1985 | Blair | 428/116 |
| 4,539,244 | 9/1985 | Beggs | 428/116 |
| 4,749,601 | 6/1988 | Hillinger | 52/806 |
| 4,931,340 | 6/1990 | Baba | 428/73 |
| 5,041,323 | 8/1991 | Rose | 428/116 |
| 5,180,619 | 1/1993 | Landi | 428/116 |

*Primary Examiner*—Ellis P. Robinson
*Assistant Examiner*—Timothy M. Speer
*Attorney, Agent, or Firm*—Christensen O'Connor Johnson & Kindness

[57] ABSTRACT

Disclosed is a lightweight honeycomb structure that comprises a top panel (34) and bottom panel (32) and a large-celled honeycomb layer (36) disposed between the top and bottom panels. The honeycomb panel structure according to the present invention can be used in such applications as a sound-absorbing payload shroud for launch vehicles, flooring and walls in aerospace applications, aircraft wings and in structures that will be exposed to high heat. Additionally, a method of making a honeycomb structure of thermoplastic material is disclosed.

23 Claims, 10 Drawing Sheets sig. 6.

LIGHTWEIGHT HONEYCOMB PANEL STRUCTURE

FIELD OF THE INVENTION

The present invention relates to composite structures in general and, in particular, to a composite panel structure for absorbing acoustic energy.

BACKGROUND OF THE INVENTION

As satellites and space-based instruments play an ever increasing role in our daily lives, scientists and engineers are continually researching new ways of placing such objects in orbit in a cost-effective and safe manner. Currently, most satellites are placed in orbit using a dedicated launch vehicle. In addition to the large aerodynamic loads and high temperatures produced by the launch vehicle during liftoff, a payload such as a satellite is subjected to high levels of acoustic energy from the launch vehicle's engines. Typical launch vehicle engines produce sound pressure levels nearing 155 dB at the payload position. To withstand this large amount of acoustic energy, a payload needs to be carefully protected or it may literally rattle apart.

To reduce the level of acoustic energy to which the payload is subjected, a launch vehicle includes a payload shroud. The payload shroud surrounds the payload and absorbs acoustic energy as well as protects the payload from dynamic air pressure and heating during liftoff, as well as such mundane hazards as wind, rain, snow, hail and lightning, etc., while the payload is sitting on the launch pad. In the past, payload shrouds were built of aluminum or composite materials such as carbon/epoxy honeycomb. Fiber glass blankets were placed around the inside of the shroud to further absorb acoustic energy produced by the launch vehicle's engines and to provide thermal insulation. Prior art payload shrouds suffer from at least three related problems: one, they are excessively heavy; two, they are excessively costly; and three, they do not provide sufficient acoustic protection for the payload. While some existing payload shrouds have been designed to be relatively lightweight, their poor acoustic performance requires the addition of heavy fiber glass blankets to meet noise requirements. These fiber glass blankets introduce another problem in addition to the increased weight and cost—they are a major source of contamination due to fiber glass dust which collects in large quantities within the blankets. Because it is virtually impossible to repair a payload in space, payloads such as satellites are typically constructed in clean rooms to prevent dust and din from fouling any mechanism before the payload is placed in orbit. To subject the payload to a dusty environment during launch defeats the purpose of the clean room construction and only increases the chance that it may malfunction in space.

Therefore, a need exists for a low-cost, lightweight payload shroud structure that provides good acoustic protection and is not a source of contaminates. The payload shroud structure should be able to be manufactured using low-cost fabrication methods and should have a low life cycle cost.

SUMMARY OF THE INVENTION

To solve the problems associated with prior art payload shroud designs, the present invention comprises a payload shroud made of a plurality of composite panels that are strong, lightweight and provide good acoustic insulation. Each panel comprises an outer panel, an inner panel and a large-celled middle honeycomb layer disposed between the inner and outer panels. The inner and outer panels are themselves panel structures that comprise an inner and outer skin that are separated by a small-celled honeycomb or thermoplastic foam layer.

Acoustic protection is provided by the panel structure of the present invention in two ways: first, by providing passive viscous damping; and second, by the use of tuned cavity absorbers built into the middle large-celled honeycomb layer. These are complementary functions that both contribute to effective noise protection. The passive viscous damping is provided by a layer of viscous damping material disposed between the inner panel and the large-celled honeycomb middle layer. Damping occurs as a result of the viscous layer transmitting shearing forces from the middle honeycomb layer to the inner panel. This process is highly effective in blocking noise transmission as long as the whole panel is made sufficiently stiff. Thus, the present invention includes the large-celled middle honeycomb layer to provide the requisite stiffness. It is the large-ceiled middle honeycomb layer that allows the synergistic combination of acoustic damping provided by the passive viscous damping layer and acoustic absorption that is provided by the tuned cavity absorbers, which require the large cavity sizes included in the large-celled middle honeycomb layer.

Acoustic absorption is provided by the panel as follows. Each large cell included within the middle honeycomb layer is tuned to a particular frequency that lies within a range of frequencies produced by the launch vehicle's engines. In one embodiment of the present invention, each cell in the middle honeycomb layer includes a tuning pipe incorporating an acoustic resistance element. The tuning pipes are inserted to various depths within the cells so that the acoustic energy from the launch vehicle's engines is absorbed evenly over the surface of the payload shroud. Additionally, the cells in the middle honeycomb layer can be tuned by placing one or more holes in the inner panel located over each cell. The diameter of the holes determines the frequency to which a particular cell is tuned.

According to another aspect of the present invention, the panel structure can be built without the tuned cells. The resulting panels are strong, stiff and lightweight enough to be used for a variety of applications such as building lightweight floors, load-beating walls or wing structures in aircraft or spacecraft.

According to yet another aspect of the present invention, the inner and/or outer panels can be adapted to include a series of channels that allow a cooling liquid to be pumped through the inner and/or outer panels. When constructed in this manner, the panels of the present invention can be used to provide thermal insulation in high temperature environments such as are found on supersonic aircraft.

According to another aspect of the present invention, the inner and/or outer panels can be adapted to include two layers of channels through which two liquids can flow in intimate thermal contact, thereby creating an intercooler built into the panel structure.

The present invention is also directed towards a method of making a honeycomb structure from a thermoplastic material. A plurality of wires or other electrical conductors are embedded in a series of thermoplastic sheets. Each wire is located at a position where it is desired that the thermoplastic sheet be bent, i.e., in a corner of a cell of the honeycomb to be formed. Alternate sections of the thermoplastic sheets are fixed together (to form the honeycomb node bonds) with an adhesive material such as epoxy, to form a stack of such sheets. Electrical current is then applied to the electrical conductors, thereby softening the thermoplastic sheets at the point where the conductors are located. The stack of thermoplastic sheets is then pulled apart to create the desired honeycomb structure.

Finally, a method for creating a curved honeycomb structure is disclosed. By machining the stack of thermoplastic sheets before the stack is heated and pulled apart, the resulting honeycomb structure will have a desired curvature.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
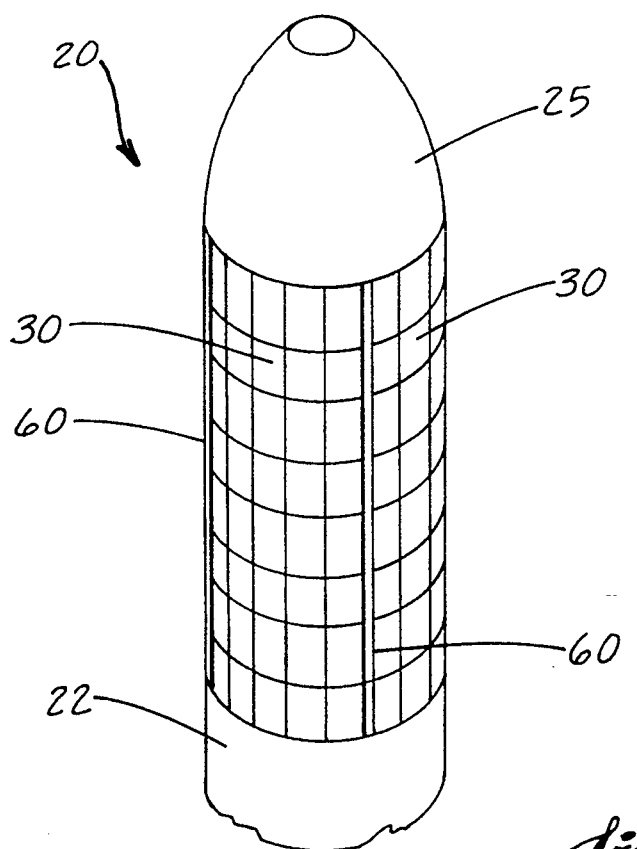
FIG. 1 is an isometric view of a payload shroud made according to the present invention.

FIG. 1 shows a payload shroud 20 according to the present invention disposed at the top of a launch vehicle 22. The payload shroud 20 encapsulates a payload (not shown) to protect the payload from such contaminates as rain, snow, dirt, etc., while the launch vehicle is on a launch pad as well as shields the payload from pressure, temperature and acoustic energy produced by the launch vehicle's engines (also not shown) during liftoff. Once the launch vehicle 22 achieves a sufficient altitude, the payload shroud 20 separates from the launch vehicle in a manner described in greater detail below, allowing the payload to be deployed into orbit.

With the exception of two or more explosive rails 60, the cylindrical body section of the payload shroud 20 is made of a plurality of composite panels 30 made according to the present invention. Each panel is approximately 3.6 meters high, 1.2 meters wide and 15 cm thick. The entire payload shroud 20 has a height of approximately 36 meters and a diameter of approximately 10 meters. However, these dimensions may vary considerably depending on the size of the launch vehicle and the particular payload.

Figure 2:
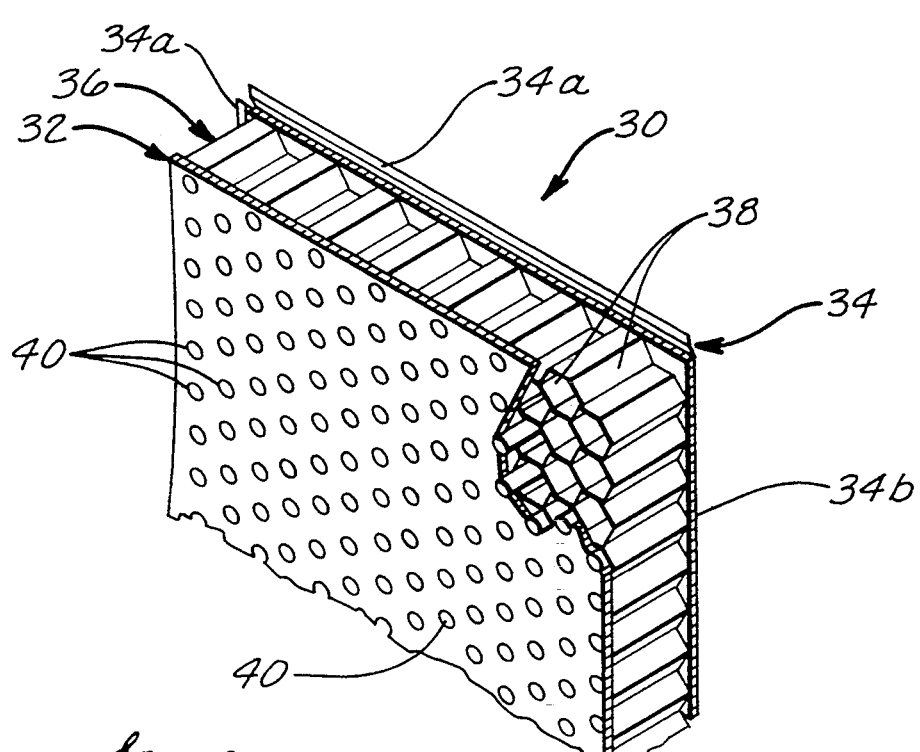
FIG. 2 is an isometric, cutaway view of a panel structure for providing acoustic damping, made according to the present invention.

A more detailed view of the composite panel 30 according to the present invention is shown in FIG. 2. The panel 30 comprises an inner (with respect to the payload shroud) panel 32, an outer panel 34 and a large-celled, middle honeycomb layer 36 disposed between the inner and outer panels. The middle honeycomb layer 36 is relatively thick compared to the inner and outer panels 32 and 34. In the preferred embodiment, the middle honeycomb layer 36 is approximately 13 cm thick, while each of the inner and outer panels are approximately 1.2 cm thick i.e., the middle layer has a thickness more than 10 times the thickness of either of the inner and outer panels. As will be described further below, the edges of the inner and outer panels are shaped to form cooperating lips and grooves where two adjacent panels can be adhered together to form a portion of a payload shroud.

As can be seen in the cutaway section of FIG. 2, the middle honeycomb layer 36 is made of a plurality of regularly repeating cells 38. Each cell 38 is approximately 15 cm in diameter. Although the cells are shown as hexagonal in shape, other closed polygon shapes could be used. The walls of the cells 38 are preferably made of corrugated aluminum or a thermoplastic sandwich material. As will be further discussed below, each cell 38 within the middle honeycomb layer 36 is tuned to a particular acoustic frequency. The inventors have found that the majority of the acoustic energy from a launch vehicle's engines occurs in a frequency band that ranges from 30–400 Hz. Therefore, each cell 38 within the middle honeycomb layer 36 is tuned to absorb energy in a portion of this frequency range.

Figure 3:
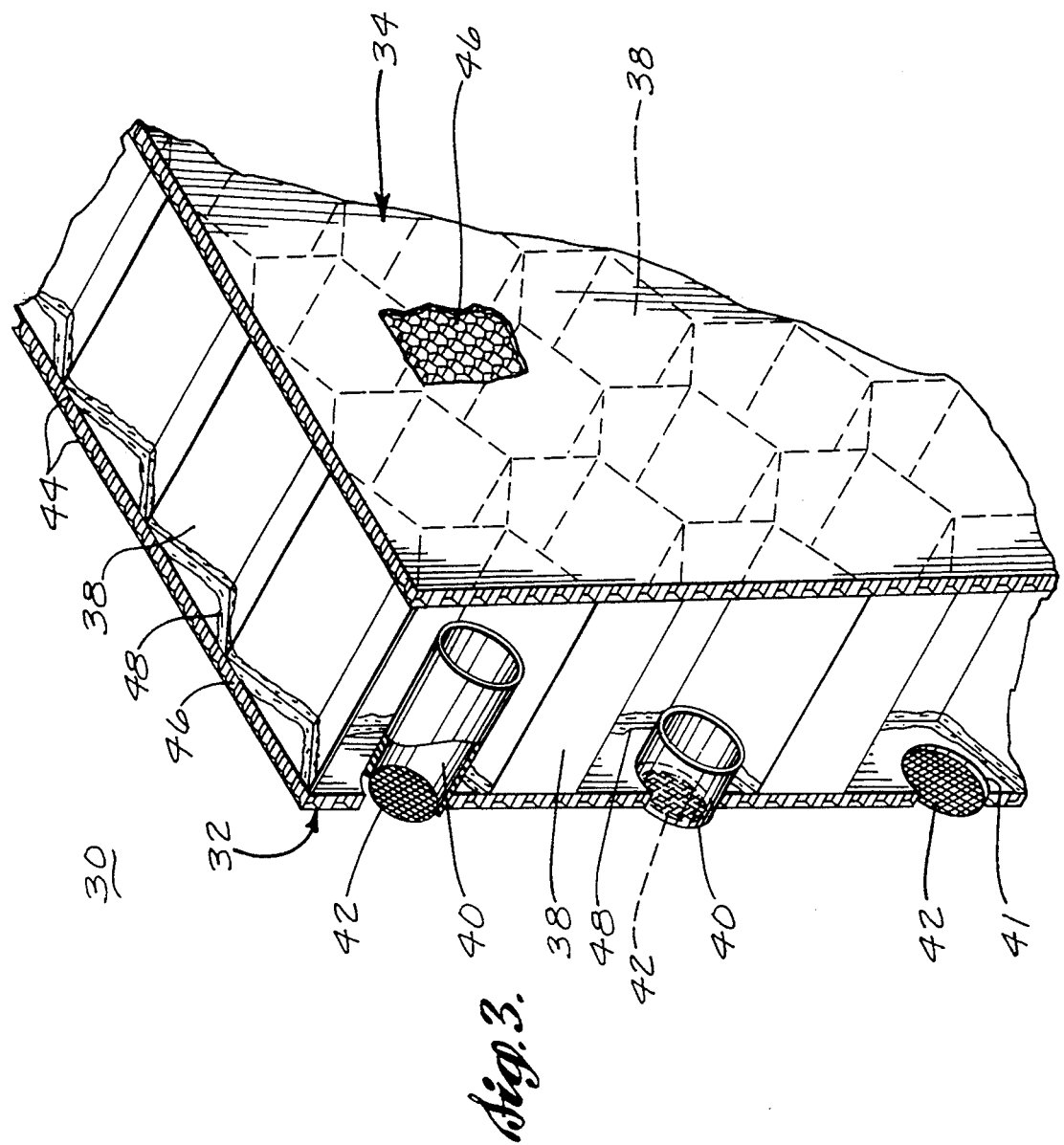
FIG. 3 is a more detailed cutaway view of the panel structure shown in FIG. 2.

How the cells 38 are tuned is more clearly shown in FIG. 3. Each cell 38 is fitted with a tuning pipe 40 by drilling an appropriately sized hole in the inner panel 32 and inserting the pipe. The tuning pipe 40 is attached to inner panel 32 via a circular flange (not shown) that is positioned at the outer end of the tuning pipe 40 and adhesively or mechanically secured to inner panel 32. The dimensions of the tuning pipe 40 determine the frequency to which the associated cell 38 is to be tuned. The tuning pipes 40 are made of either a thermoplastic material or aluminum, roughly 0.025 cm thick. However, other materials could be substituted. A screen 42 is placed at the inner face of each tuning pipe adjacent the inner panel 32, to dissipate the energy of the air rushing in and out of the cell as the cell resonates at its tuned frequency. The screen 42 also serves to broaden the range of frequencies to which an individual cell is tuned. Finally, the screen 42 keeps any particles within the large cells 38 from entering the inside of the payload shroud, thereby reducing the possibility of payload contamination.

As stated above, each cell 38 is tuned to absorb energy in a portion of the range from 30-400 Hz in order to dissipate the acoustic energy from the launch vehicle's engines. Therefore, the dimensions of the tuning pipes depend on the desired resonant frequency and volume of the cell. Assuming the end of the tuning pipe is roughly flush with the inner panel 32, the relationship between the construction of a cell 38 and its resonant frequency $f_{res}$ is given by the following equation.

$$f_{res} = \frac{c_0}{2\pi} \sqrt{\frac{G}{V}} \quad (1)$$

where V is the volume of the cell, $c_0$ is the speed of sound in air, and G is the conductance of the cell, which can be expressed as:

$$G = S/L' \quad (2)$$

where S is the cross-sectional area of the tuning pipe and L' is the length of the tuning pipe plus 0.8 times the diameter of the tuning pipe. As can be seen from the above formulas, the resonant frequency of the cell can be altered by changing the volume of the cell or by changing the dimensions of the tuning pipe 40.

In the preferred embodiment, the composite panels 30 that comprise the payload shroud are tuned so that the acoustic energy from the launch vehicle's engines will be uniformly dissipated across the length and width of the panel. This is accomplished by intermixing cells having a resonant frequency at the upper end of the 30-400 Hz frequency range with cells having a resonant frequency at the lower end of the range.

Another way of tuning the individual cells 38 is to eliminate the tuning pipes 40 and simply use one or more holes 41 in the portion of the inner panel 32 closing each cell 38. The collective diameter d of the hole or holes associated with each cell is selected to tune the cell to a resonant frequency $f_{res}$ according to the following equation:

$$d = V \left( \frac{2\pi \cdot f_{res}}{c_0} \right)^2 \quad (3)$$

where $c_0$ is the speed of sound in air, d is the sum of the diameters of the holes and V is the volume of the cell. The diameter d can be the diameter of one hole or the sum of the diameters of several holes. For example, a 5 cm hole will tune a cell to the same frequency as a cell having two holes, each having a diameter of 2.5 cm.

Figure 4:
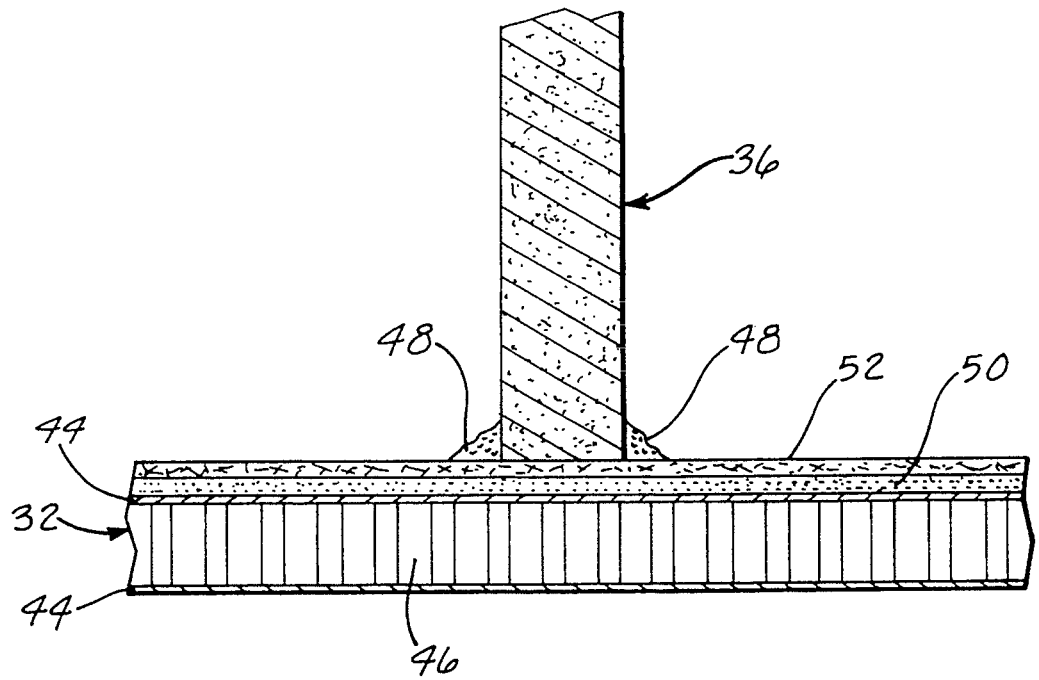
FIG. 4 is an enlarged, cross-sectional view of the panel structure showing the placement of a septum layer and a viscoelastic layer.

FIG. 4 shows an enlarged cross-sectional view of the inner panel 32 and one wall of a cell included in the middle honeycomb layer 36. This cross-sectional view shows the construction of the inner panel 32 and how the middle honeycomb layer 36 is bonded to the inner panel 32 via a septum layer 52 and the viscoeleastic layer 50 described in detail below. The outer panel 34 is constructed in the same way as the inner panel 32 but has no septum layer 52 or viscoelastic layer 50 and will not be discussed separately. The inner panel 32 is itself a composite structure that includes an inner and outer skin 44 and a middle small-celled, honeycomb layer 46 disposed between the inner and outer skins. Preferably, the inner and outer skins 44 are made of either sheets of aluminum or a thermoplastic composite material, while the small-celled, middle honeycomb layer 46 is made of an aluminum or composite honeycomb material. The inner and outer skins are approximately 0.09 cm thick, while the middle honeycomb layer 46 is approximately 0.45 cm thick. Each small cell within the middle honeycomb layer 46 has a diameter of approximately 0.45 cm. The inner and outer skins 44 are bonded to the middle honeycomb layer 46 by a suitable adhesive 48. As will be appreciated by those skilled in the art, the dimensions of the inner and outer panels may be varied depending on the degree of stiffness required. It is also possible to replace the small-celled honeycomb layer 46 with a spacing layer of low-density thermoset or thermoplastic foam. For example, a polyurethane foam could be used to provide sufficient stiffness and shear strength required of the inner and outer panels. The thermoset or thermoplastic foam could be either injected between the inner and outer skins or can be pre-cast into a sheet such that the skins can be adhered directly to the cured foam sheet.

The cells of the middle large-celled honeycomb layer 36 can be made of a thermoplastic sandwich, corrugated aluminum ribbon or a composite structure that is constructed in the same manner as the inner and outer panels 32, 34. The selection of the material used to make the middle honeycomb layer 36 is dictated by the intended use and strength requirements of the panel 30.

Also shown in FIG. 4 is a layer of viscoelastic material 50 and a septum layer 52 that are disposed between the middle honeycomb layer 36 and the inner panel 32. The viscoelastic layer is preferably 0.16 cm thick and the septum layer is preferably 0.02 cm thick. The viscoelastic material dissipates shear energy transmitted from the outer panel 34 through the middle honeycomb layer 36 to the inner panel 32. An example of an appropriate viscoelastic material is Scotchdamp ® ISD 112 made by 3M of Minneapolis, Minn. However, other similar materials could be used. The septum layer 52 is made of a thin sheet of fiber glass and serves to protect the viscoelastic layer from being engaged and cut by the middle honeycomb layer 36 as well as to provide a good bonding surface for the adhesive 48. In the preferred embodiment, there is no viscoelastic material or a septum layer disposed between the middle honeycomb layer 36 and the outer panel 34.

Figure 5:
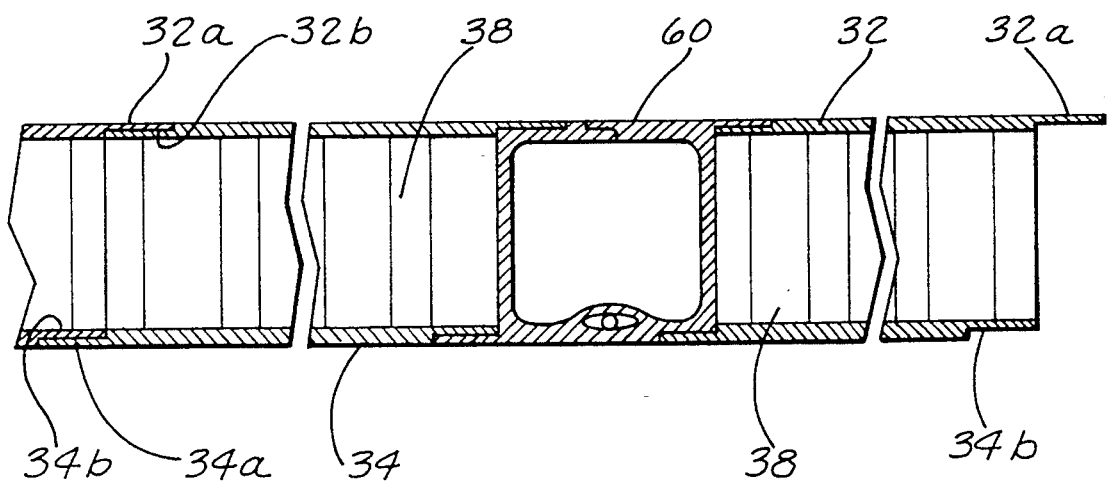
FIG. 5 is a cross-sectional view taken around the perimeter of a payload shroud showing how adjacent panels are bonded together.

Turning now to FIG. 5, a cross-sectional view of a section of a payload shroud shows how adjacent panels are bonded together. As stated above, the edges of the inner and outer panels 32 and 34 that comprise an individual composite panel 30 are correspondingly shaped so that two adjacent panels fit together. One edge of the inner panel 32 includes an outwardly extending lip 32a that fits in a corresponding inwardly extending groove 32b on an adjacent panel. Similarly, one edge of the outer panel 34 is formed as an outwardly extending lip 34a that fits in an inwardly extending groove 34b. Although not shown, the top and bottom edges of the composite panels 30 are fashioned to form similarly shaped cooperating lips and grooves that are used to adhere two vertically adjacent panels together. The corresponding lips and grooves 32a and 32b may be secured together by, for example, a layer of adhesive or a plurality of rivets.

As is shown in FIG. 1, a number of explosive rails 60 are located at regular intervals around the circumference of the payload shroud 20. The explosive rails 60 contain similarly shaped lips and grooves to mate with the corresponding lips and grooves on the adjacent panels 30. Once the launch vehicle has attained a sufficient altitude, the rails 60 are remotely detonated, thereby removing the shroud from the launch vehicle and exposing the payload to space. An example of such an explosive rail is a SUPERZIP ® rail made by the McDonnell Douglas Corporation, St. Louis, Mo.

Figure 6:
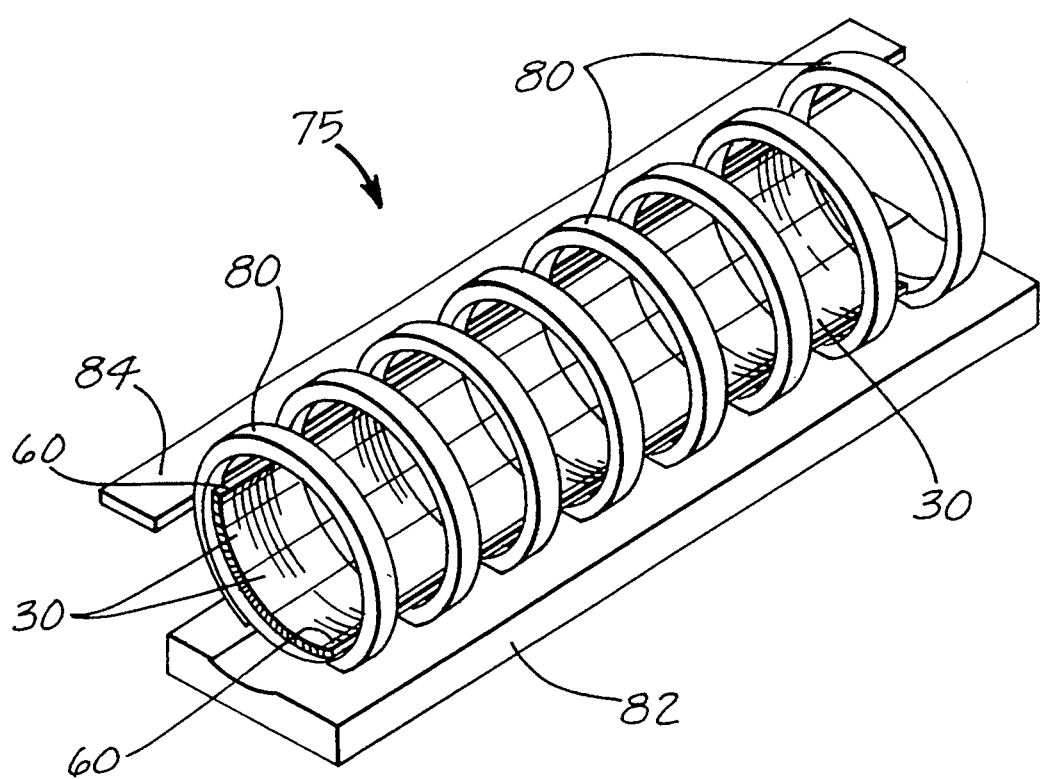
FIG. 6 shows a support structure in which the panel structures according to the present invention are placed to assemble the payload shroud.

FIG. 6 shows one type of support structure in which to assemble a payload shroud from a plurality of panels according to the present invention. The structure 75 comprises a series of cylindrical mandrels 80 that are held upright by a base support structure 82. The inner circumference of the cylindrical mandrels 80 includes appropriate chucks to hold a work piece in place as the payload shroud is being assembled. Each mandrel has an inner diameter slightly larger than the outer diameter of the payload shroud. Included within the base support structure 82 is a drive mechanism (not shown) that rotates all the mandrels to a desired location. A scaffolding 84 surrounds the mandrels and allows technicians to work on an individual panel as the shroud is being assembled.

A payload shroud 20 is constructed on the structure 75 by first securing the explosive rails 60 inside the mandrels at the appropriate positions of this inner circumference. Next, a number of panels 30 are laid end to end along the inside of the mandrels and secured to the bottom explosive rail 60. The base support structure 82 then rotates the mandrels so a new length of panels can be laid down and joined to an adjacent panel by a suitable adhesive and/or rivets as described above. This process continues until the entire circumference of panels and explosive rails has been installed. Once the cylindrical section of the shroud 20 is complete, the top halves of the mandrels 80 are removed by a crane (not shown), the assembled shroud body is lifted upright, and the nose cone 25 is attached. The nose cone can be a standard biconic design utilizing the same type structure used to fabricate the cylindrical section. The details of how to construct a nose cone are well known to those of ordinary skill in the an.

The payload shroud 20 made of the composite panels 30 according to the present invention is lighter, stronger, cleaner and provides better acoustic protection than previous payload shroud designs. Additionally, it is anticipated that the present design is also less expensive to manufacture than previous payload shroud designs.

Figure 7:
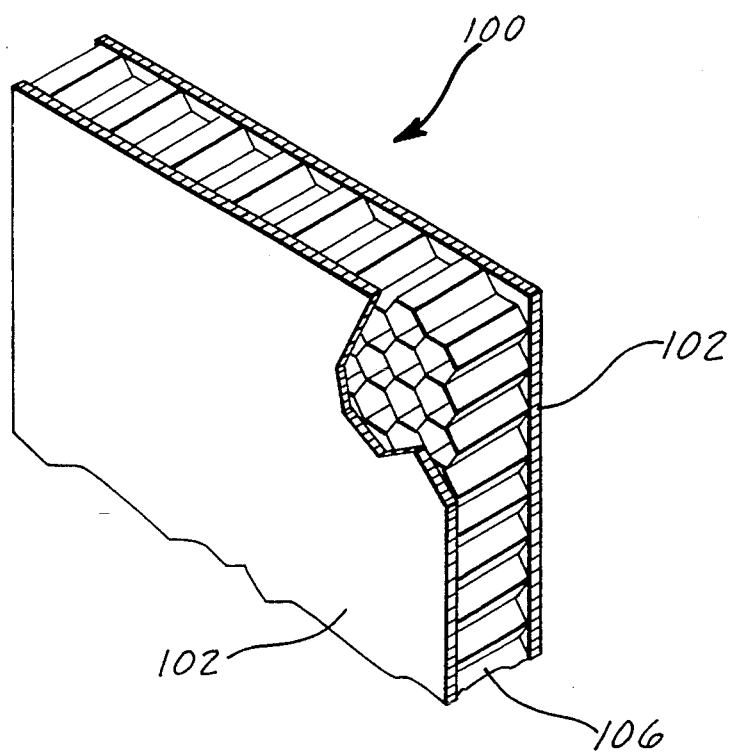
FIG. 7 is an isometric, cutaway view of a panel structure made without the tuned cells, viscoelastic and septum layers according to another aspect of the present invention.

Due to its light weight and high strength, the composite panel of the present invention is suited to many additional uses besides the construction of a payload shroud. FIG. 7 shows an isometric view of a flat composite panel structure 100 according to a second aspect of the present invention. The panel structure 100 comprises a pair of outer panels 102, and a large-celled middle honeycomb layer 106. Each outer panel 102 and the middle honeycomb layer 106 is constructed in the same way as the corresponding panel structure shown in FIGS. 2-4 described above except that the cells of the middle honeycomb layer 106 are not tuned and the panel does not contain the viscoelastic and fiber glass septum layers. In the panel structure 100, the outer layers 102 are adhered directly to the middle honeycomb layer 106. One use for the panel structure 100 is as a flooring material for aircraft. The panel structure is strong enough that it can be used as a floor without the supporting braces currently required in aircraft, thereby significantly reducing manufacturing costs. The use of a panel structure 100 would significantly reduce the weight of an aircraft, thereby increasing fuel efficiency. Additionally, such a flat panel structure 100 could be used to make load-bearing walls in a spacecraft, for instance.

Yet another use for the panel structure 100 is to provide thermal insulation. The design of the panel structure naturally provides an efficient thermal barrier because of the long heat conduction paths through the thin cell walls of the middle honeycomb layer 106. The thick, trapped air spaces of the individual cells that comprise the middle honeycomb layer also provide excellent insulation. These insulation qualities can be enhanced by coating the panels 102 with a reflective material such as aluminum or gold, roughly $10^{-4}$ cm thick, to reduce radiative heat transfer. The insulation properties of the panel 100 can be still further improved by removing the air from the middle honeycomb layer 106. A tank built from such structure can store rocket fuels and oxidizers, or other materials that need to be kept at very hot or very cold temperatures.

Figure 8:
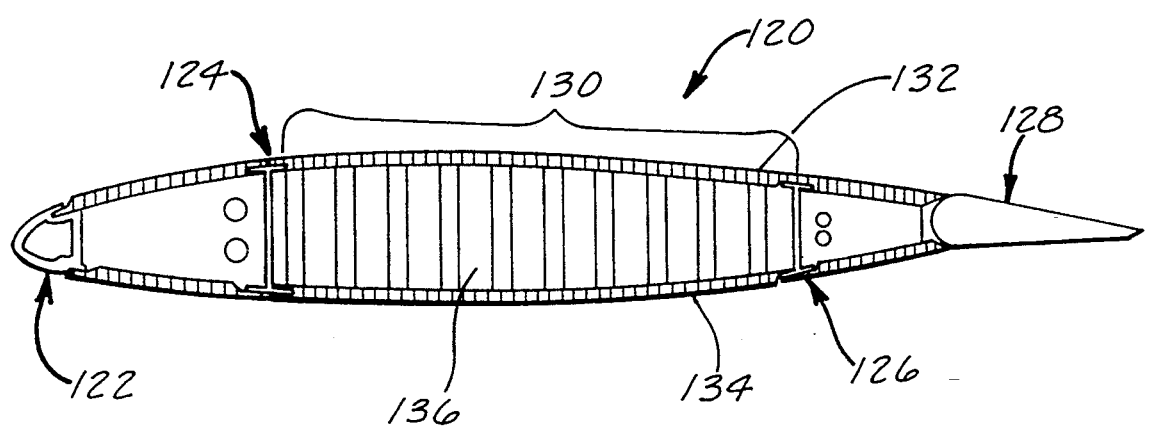
FIG. 8 is a cross-sectional view of an airfoil made of a panel structure according to another aspect of the present invention.

FIG. 8 shows an example of the composite structure according to the present invention used in an airfoil. The airfoil 120 includes a leading edge 122, a pair of ribs 124, 126, an elevator 128 and a torque box 130. With the exception of the torque box 130, the construction of the airfoil 120 is well known to those skilled in the art. The torque box includes a top panel 132, a bottom panel 134 and a large-celled, middle honeycomb layer 136 disposed between the top and bottom panels. The top and bottom of the middle honeycomb 136 is shaped so that the torque box 130 has an aerodynamic cross section. As with the panel structures shown in FIG. 7, the top and bottom panels 132 and 134 are constructed in the same way as the panels 102 described above. The cells within the middle honeycomb layer 136 also do not need to be all the same size or have the same wall thickness, but may be varied to evenly distribute the forces placed on the airfoil. By using the lightweight panel structure according to the present invention in an aircraft wing, the need for conventional support structures found in a wing is reduced, thereby reducing the weight of the wing and increasing the fuel efficiency of an aircraft.

Figure 9A:
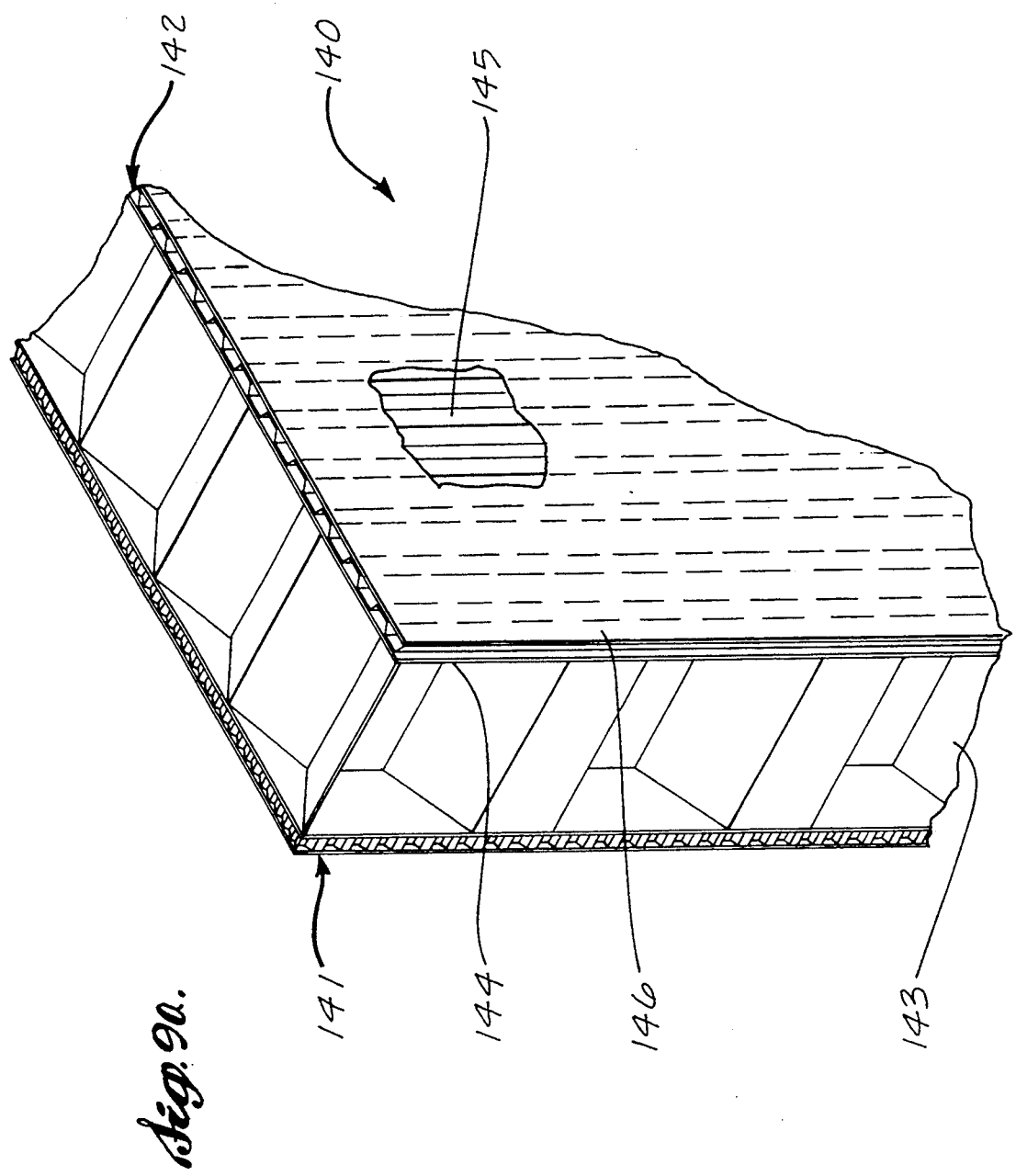
FIG. 9A is a cross-sectional view of a panel structure including a series of channels for cooling an outer surface thereof, according to yet another aspect of the present invention.

The panel structure according to the present invention is also suitable for use in structures that are exposed to high heat. One example of such a structure may be on the leading edge of a supersonic aircraft. FIG. 9A shows a panel structure 140 that is modified for use in areas of high heat. The panel structure 140 comprises a top panel 142, a bottom panel 141 and a large-celled middle honeycomb layer 143. The difference between the panel structure 140 and the panel structures described above is the composition of the top panel 142. The top panel comprises a top skin 146, a bottom skin 144 and a middle corrugated layer 145. For high heat applications it is desirable to fashion the entire top panel 142 from a material having a high melting point such as titanium. The bottom panel 141 and middle large-celled honeycomb layer 143 can be made of corrugated metal or a thermoplastic sandwich, depending on the heat load. The middle corrugated layer 147 forms a plurality of channels that run along the middle of the top panel 142. Liquid coolants can be pumped through these channels by one or more circulation pumps P as shown diagrammically in FIG. 9C to provide cooling to the top panel.

Figure 9B:
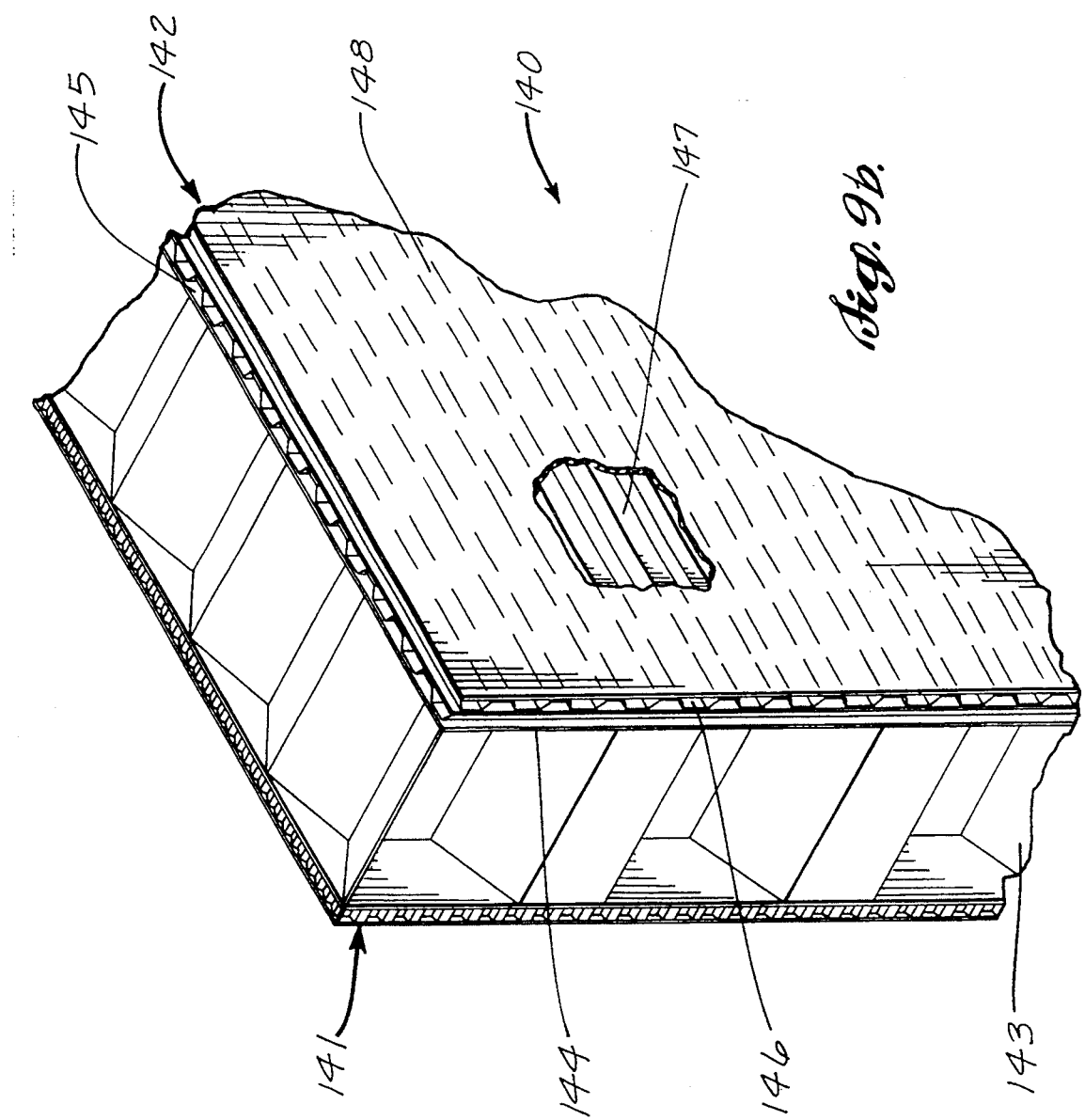
FIG. 9B shows a variation of the panel structure including cooling channels shown in FIG. 9A according to yet another aspect of the present invention.
Figure 9C:
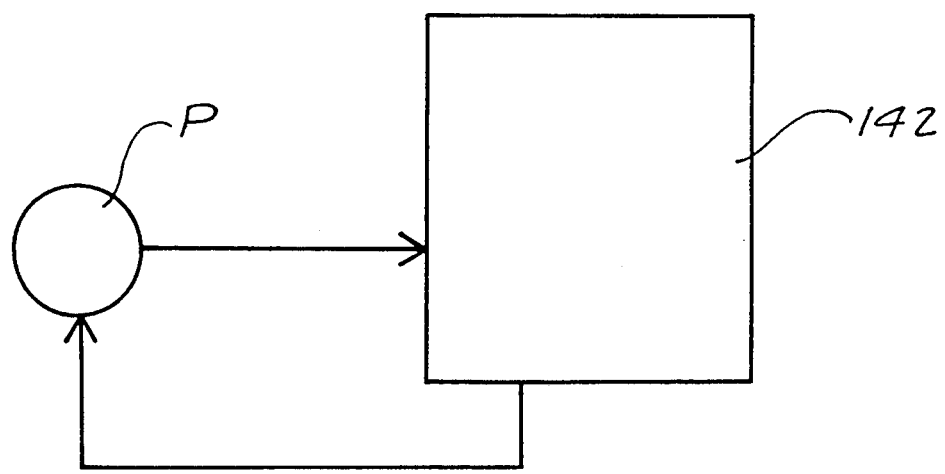
FIG. 9C is a diagrammatic representation of a pump that circulates coolant through the channels shown in FIGS. 9A and 9B.

FIG. 9B shows a variation of the panel structure 140 shown in FIG. 9A. In this variation, a second corrugated layer 147 is bonded directly to the top skin 146. Bonded to the top of the second corrugated layer 147 is another skin 148. The second corrugated layer 147 forms a second series of channels that can be oriented in parallel or orthogonal to the first series of channels formed by the first corrugated layer 145. Liquids of different temperatures can be passed through these two sets of channels, thereby creating an efficient heat transfer between the two corrugated layers 145 and 147. The two sets of corrugated layers thus form an intercooler that is integral within the panel structure 140.

Figure 10:
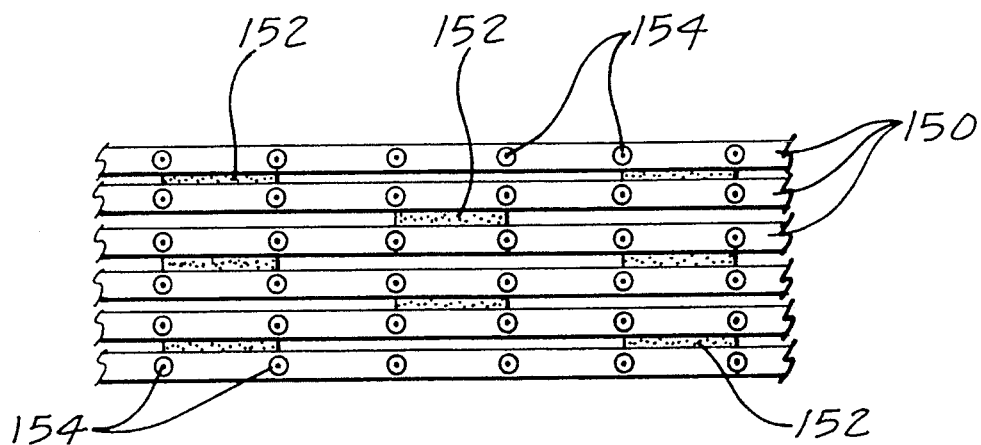
FIG. 10 shows a method of making a thermoplastic honeycomb structure according to yet another aspect of the present invention.
Figure 11:
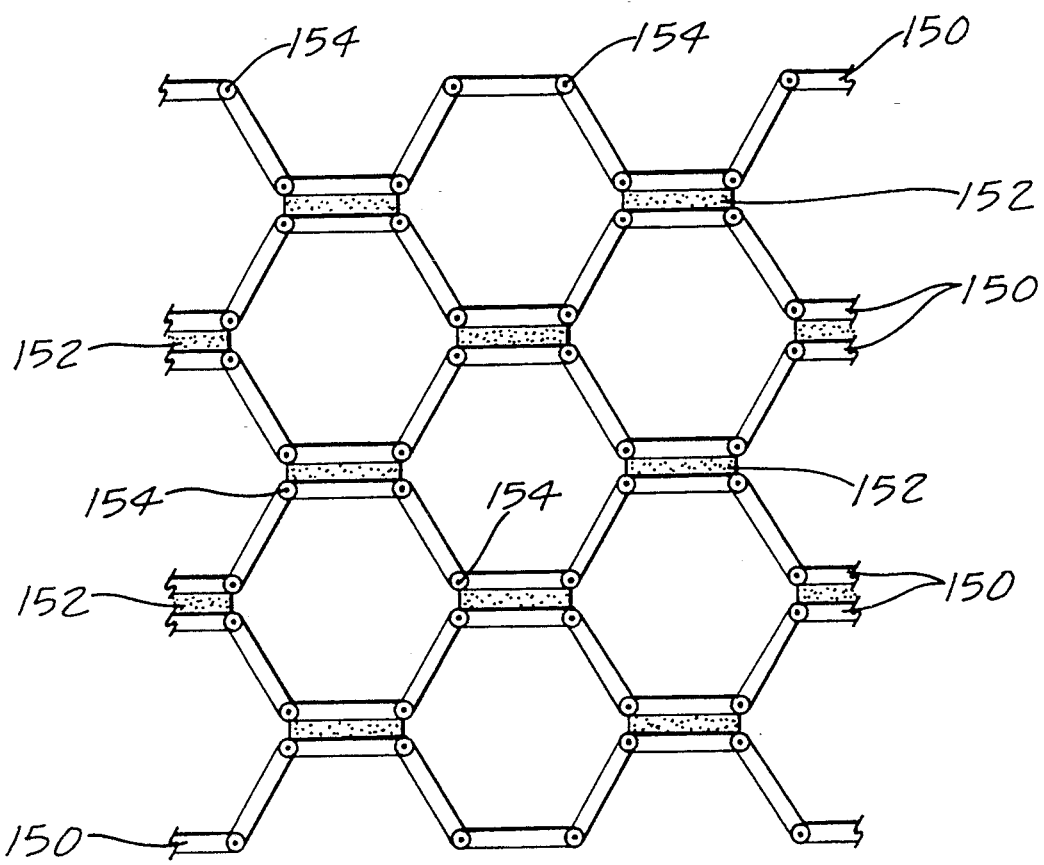
FIG. 11 shows how the structure shown in FIG. 10 is pulled apart to create a honeycomb structure according to the present invention.

Yet another aspect of the present invention is shown in FIGS. 10 and 11. As described above, the middle honeycomb layer as used in the panel structures 30, 100, 130 and 140 is made of either corrugated aluminum or a thermoplastic material. Prior to the present invention, it had been difficult to produce large quantities of honeycomb made of a thermoplastic material in a cost-effective manner. Previously, thermoplastic material had to be cut to the correct size and assembled in large jigs. The individual pieces of thermoplastic that make up the honeycomb layer needed to be held in place until the pieces could be glued together. This process was both tedious and time-consuming FIG. 10 shows a stack of thermoplastic sheets 150 that have been glued together at alternate points by an adhesive 152. A plurality of wires or other electrical conductors 154 are embedded in each thermoplastic sheet 150 at equally spaced intervals. This would be done at the time the composite sheets were consolidated. The end of the wires 154 are then coupled to a source of electrical current (not shown). Preferably, the portions of the wires 154 in contact with the thermoplastic sheets have a high electrical resistance. Thus, as the electrical current is passed through the wires, electrical heating losses cause the wires to become hot and the thermoplastic material to become flexible at areas surrounding the wires. Upon the application of a sufficient current to the wires 154, the stack of thermoplastic sheets 150 can be pulled apart in a direction perpendicular to the sheets, thereby creating the honeycomb shown in FIG. 11. After pulling the stack of thermoplastic sheets apart, the current flowing in the wires 154 is interrupted, allowing the areas around the wires to cool and harden. As can be seen, this method provides a simple way of creating honeycomb from a thermoplastic material that is efficient and cost-effective.

Finally, some of the applications for the panel structure according to the present invention and described above require a layer of curved honeycomb. For example, in the payload shroud 20 shown above, it is necessary that each panel be slightly curved to fit around the shroud's circumference. Similarly, the airfoil shown in FIG. 8 requires the middle honeycomb layer to be slightly curved on both its upper and lower surfaces.

Figure 12:
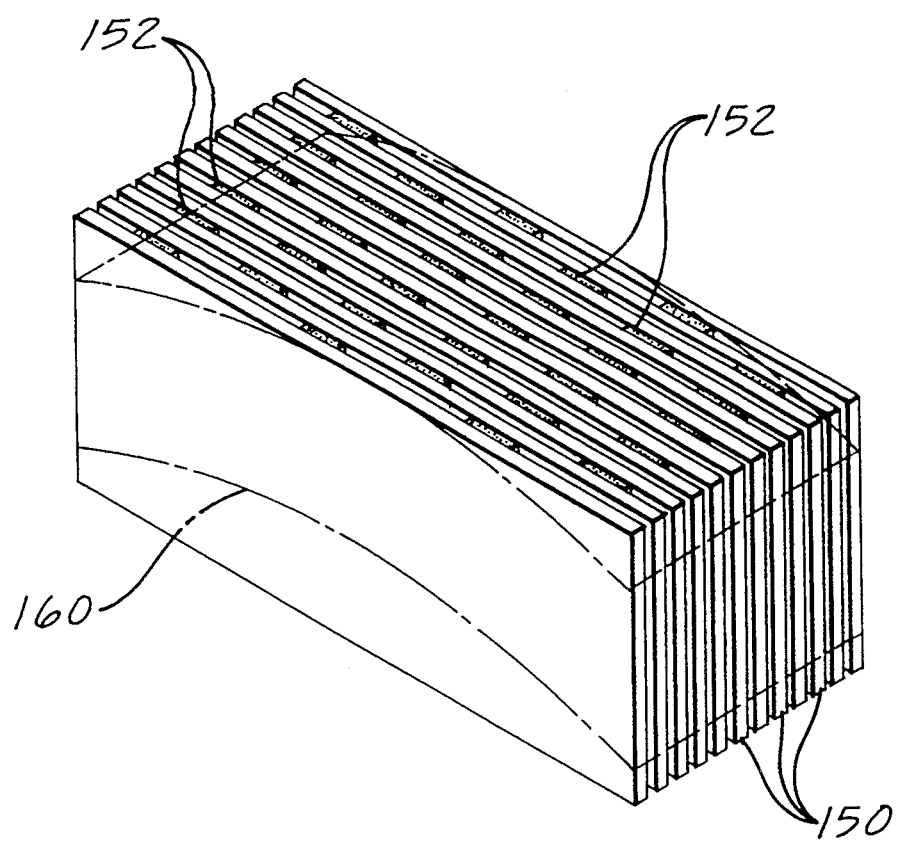
FIG. 12 shows how a stack of thermoplastic material can be shaped to create a curved honeycomb layer according to yet another aspect of the present invention.

FIG. 12 shows how a stack of thermoplastic sheets 150 similar to that shown in FIG. 10 can be shaved to create a curved honeycomb structure. The stack of thermoplastic sheets 150 can be cut along a line 160 using a laser or other cutting mechanism, either before or after stacking the individual thermoplastic sheets that comprise the stack. When the shaped stack is pulled apart in the manner shown in FIG. 11, the resulting honeycomb structure will be curved. The process of cutting the stack before it is pulled apart eliminates the need to machine a large piece of honeycomb material in order to achieve the desired curvature.

While the preferred embodiments of the various aspects of the present invention have been illustrated and described, it will be appreciated that various changes can be made therein without departing from the spirit and scope of the invention. Therefore, it is intended that the scope be determined solely from the following claims.

The embodiments of the invention in which an exclusive property or privilege is claimed are defined as follows:

1. A lightweight honeycomb structure that absorbs acoustic energy in a range of frequencies comprising:
   a first panel comprising a first top skin, a first bottom skin and a first spacing layer disposed between the first top skin and the first bottom skin;
   a second panel comprising a second top skin, a second bottom skin and a second spacing layer disposed between the second top skin and the second bottom skin;
   a middle honeycomb layer sandwiched between the first and second panels, wherein the middle honeycomb layer includes a plurality of tuned cells, each of which resonates at a frequency within the range of frequencies;
   a layer of viscoelastic material disposed between the second panel and the middle honeycomb layer; and
   a septum layer overlaying the layer of viscoelastic material such that the septum layer is disposed between the layer of viscoelastic material and the middle honeycomb layer, said septum layer preventing engagement of the viscoelastic layer by the middle honeycomb layer but being bonded therebetween for dissipating sheer energy transmitted from the first panel through the middle honeycomb layer.

2. The honeycomb structure of claim 1, wherein the second panel further comprises:
   a plurality of holes cut in the second panel such that the holes lie over the plurality of tuned cells, wherein each hole has a diameter chosen so that the given cell over which the hole is placed resonates at a frequency within the frequency range.

3. The honeycomb structure of claim 2, further comprising a screen disposed in each of the holes located in the second panel.

4. The honeycomb structure of claim 1, further comprising:
   a plurality of tuning pipes that extend from the second panel into the plurality of tuned cells, wherein each tuning pipe has a length and cross-sectional area chosen so that the cell in which the tuning pipe is inserted resonates at a frequency within the range of frequencies.

5. The honeycomb structure of claim 4, further comprising a screen disposed in each of the tuning pipes.

6. The honeycomb structure of claim 1, wherein the first and second spacing layers comprise a plastic foam material.

7. The honeycomb structure of claim 1, wherein the first and second spacing layers comprise a honeycomb material.

8. A lightweight payload shroud designed to be fitted on a launch vehicle to absorb acoustic energy within a frequency range, comprising:

a plurality of honeycomb panels that form at least a portion of an outer surface of the payload shroud, each panel including:

(a) a first panel that includes a first top skin, a first bottom skin and a first honeycomb layer disposed between the first top skin and the first bottom skin;

(b) a second panel that includes a second top skin, a second bottom skin and a second honeycomb layer disposed between the second top skin and the second bottom skin;

(c) a middle honeycomb layer sandwiched between the first and second panels, wherein the middle honeycomb layer includes a plurality of tuned cells, each of which resonates at a frequency within the frequency range;

(d) a layer of viscoelastic material disposed between the second panel and the middle honeycomb layer; and (e) a septum layer overlaying the layer of viscoelastic material such that the septum layer is disposed between the layer of viscoelastic material and the middle honeycomb layer, said septum layer preventing engagement of the viscoelastic layer by the middle honeycomb layer but being bonded therebetween for dissipating sheer energy transmitted from the first panel through the middle honeycomb layer.

9. The payload shroud of claim 8, further comprising a nose cone disposed on a top of the shroud.

10. The payload shroud of claim 9, further comprising one or more explosive rails disposed about the circumference of the shroud, the explosive rails being remotely detonable to remove the shroud from the launch vehicle.

11. The payload shroud of claim 8, wherein the honeycomb panels further comprise:

a plurality of holes cut in the second panel such that the holes overlie the plurality of tuned cells, wherein each hole has a diameter chosen so that a given cell over which the hole is placed resonates at a frequency within the frequency range.

12. The payload shroud of claim 11, further comprising a screen disposed in each of the holes disposed over the plurality of tuned cells.

13. The payload shroud of claim 8, wherein the honeycomb panels further comprise:

a plurality of tuning pipes that extend from the second panel into the plurality of tuned cells included in the middle honeycomb layer, wherein each tuning pipe has a dimension chosen so that the cell in which the tuning pipe is inserted resonates at a frequency within the frequency range.

14. The payload shroud of claim 13, further comprising a screen disposed in each of the tuning pipes.

15. The payload shroud of claim 8, wherein the frequency range at which each tuned cell resonates lies in a range between 30–400 Hertz.

16. A lightweight composite panel structure comprising:

a first panel that includes a first outer skin, a first inner skin, and a first spacing layer of a honeycomb material disposed between the first outer skin and the first inner skin;

a second panel that includes a second outer skin, a second inner skin and a second layer of honeycomb material disposed between the second outer skin and the second inner skin; and a large-celled middle honeycomb layer sandwiched between the first and second panels.

17. A lightweight panel structure comprising:

a first panel that includes a first outer skin, a first inner skin and a first corrugated layer disposed between the first outer skin and the first inner skin, wherein the corrugated layer forms a plurality of channels between the first outer skin and the first inner skin, the channels being capable of passing a coolant to draw heat away from the first panel;

a second panel that includes a second outer skin, a second inner skin and a spacing layer disposed between the second outer skin and the second inner skin; and a middle honeycomb layer sandwiched between said first and second panels.

18. The honeycomb structure of claim 17, wherein the first outer skin, the first inner skin and the corrugated layer are partially made of aluminum.

19. The honeycomb structure of claim 17, wherein the first outer skin, the first inner skin and the corrugated layer are partially made of thermoplastic.

20. The honeycomb structure of claim 17, wherein the first outer skin, the first inner skin and the corrugated layer are partially made of titanium.

21. The honeycomb structure of claim 17 wherein the first panel includes a second corrugated layer in intimate thermal contact with the first outer skin, the second corrugated layer forming a second plurality of channels capable of passing a coolant.

22. A lightweight panel structure comprising:

a first panel that includes a first outer skin, a first inner skin and a first corrugated layer disposed between the first outer skin and the first inner skin, wherein the corrugated layer forms a plurality of channels between the first outer skin and the first inner skin;

a second panel that includes a second outer skin, a second inner skin and a spacing layer disposed between the second outer skin and the second inner skin; and a middle honeycomb layer sandwiched between said first and second panels.

23. The panel structure of claim 22, further including:

means for circulating a coolant through said plurality of channels to draw heat away from the first panel.

* * * * *